United States Patent [19]

Fan et al.

[11] Patent Number: 4,624,789
[45] Date of Patent: Nov. 25, 1986

[54] MASS TRANSFER INTO POROUS GRANULES USING STRATIFIED SEMIFLUIDIZED BEDS

[75] Inventors: Liang-tseng Fan; Alexander P. Mathews, both of Manhattan, Kans.

[73] Assignee: Kansas State University Research Foundation, Manhattan, Kans.

[21] Appl. No.: 713,252

[22] Filed: Mar. 18, 1985

[51] Int. Cl.[4] .................... B01D 15/02; B01D 53/12
[52] U.S. Cl. ........................................ 210/661; 55/77
[58] Field of Search ............... 210/661, 679, 686, 290, 210/503; 55/74, 77, 387, 390

[56] References Cited

U.S. PATENT DOCUMENTS

| | | | |
|---|---|---|---|
| 3,374,052 | 3/1968 | Fan et al. | 210/661 |
| 3,420,709 | 1/1969 | Barrett et al. | 210/503 |
| 3,471,025 | 10/1969 | Dobson | 210/290 |

Primary Examiner—Ivars Cintins
Attorney, Agent, or Firm—Tilton, Fallon, Lungmus & Chestnut

[57] ABSTRACT

Mass transfer of components from gases or liquids into porous absorbent granular media is carried out by a method using a semifluidized bed in stratified condition. The absorbent medium is composed of both small and large granules. In the stratified bed, at least part of the small size granules are captivated in a packed upper section. The larger granules are primarily in a fluidized section below the packed section. The fluid being treated flows upwardly through the bed first contacting the larger granules in the fluidized section and then exiting through the smaller packed granules. With this arrangement, increased fluid volumes can be processed before breakthrough of the component being absorbed.

10 Claims, 3 Drawing Figures

GRADED SORBENT MEDIA IN COMPLETELY FLUIDIZED BED

FLUID EXIT

FLUID UNDER PUMP PRESSURE

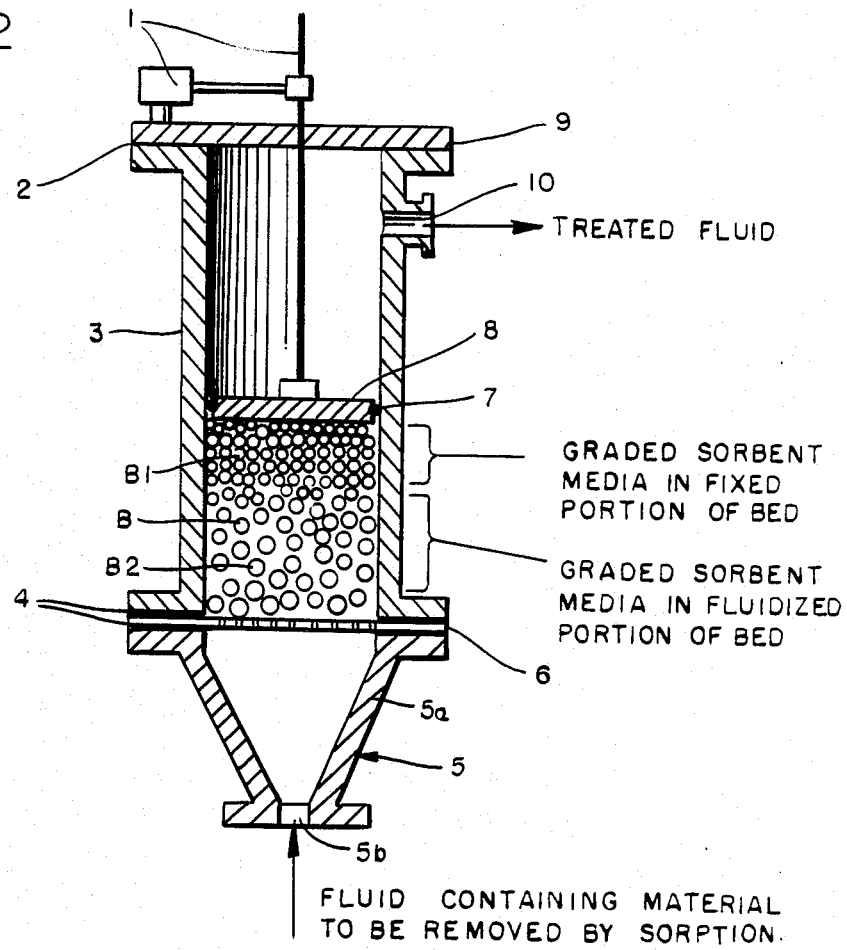

MASS TRANSFER INTO POROUS GRANULES USING STRATIFIED SEMIFLUIDIZED BEDS

FIELD OF INVENTION, BACKGROUND, AND PRIOR ART

The field of this invention relates to chemical operations and processes carried out in semifluidized beds. More particularly, this application relates to mass transfer operations, such as adsorption and ion exchange, using porous granules in semifluidized beds.

Mass transfer operations in which a removable component is transferred from a liquid or a gas into porous granules can be carried out with the granules arranged in fixed beds, fluidized beds, or semifluidized beds. In the latter bed arrangement, a fixed bed portion is maintained above a fluidized bed portion in an upflow fluidized bed-type apparatus. By a vertical adjustment of the position of the sieve plate at the top of the bed, the size of the fixed bed portion can be varied with a corresponding increase or decrease in the fluidized bed portion. Because of this feature, semifluidized beds have also been referred to as "convertible" beds, the fluidized and fixed bed portions being selectively convertible.

Semifluidized bed contacting was originated and patented by Liang-tseng Fan and Chen-yung Wen (See U.S. Pat. No. 3,374,052, and *A.I.Ch.E. Journal* (1959), Vol. 3, No. 3, pp. 407–409.) Various uses for semi-fluidized bed contacting, have been proposed, viz. ion exchange processes, drying of gases, adsorption of contaminants from liquids, etc. The mathematical characteristics of semi-fluidized beds have been delineated by Fan and Wen: *A.I.Ch.E. Journal* (1960), Vol. 6, No. 3, 482–487; and *A.I.Ch.E. Journal* (1963), Vol. 9, No. 3, pp. 316–320.

In recent years, a number of special uses of semifluidized beds have been patented, including filtration (U.S. Pat. No. 4,157,959) and wastewater treatment in biological reactors (U.S. Pat. No. 4,322,296). However, although the potential desirability of using semifluidized beds for mass transfer operations, such as adsorption or ion exchange, has been recognized, such applications have received very little consideration since Fan and Wen originally disclosed their concept for semifluidized bed contacting.

Adsorption is a mass transfer unit operation used in chemical processing, water and wastewater treatment, air pollution control, etc., to remove materials present in small concentrations in fluids. This operation has generally been carried out in fixed beds by contacting large volumes of fluid with small quantities of adsorbent. Since large volumes of fluid are usually being processed, the amount of pump energy required to move the fluids (gas or liquids) through the beds is a very significant economic factor. Potentially large energy savings might be made by carrying out such mass transfer operations in semifluidized beds. The pressure drop across a semifluidized bed containing the same amount of adsorbent as a fixed bed is much lower than that across a fixed bed. Therefore, lower pump pressures and energy consumption are required for treating the same volumes of fluid.

It has also been recognized that in applications involving interphase mass transfer in gas-solid or liquid-solid systems, operating efficiency can be improved by increasing the external mass transfer rate, viz. from the fluid phase to the solid phase. In a semifluidized bed, the porous granules in the fluidized portion of the bed are vigorously agitated due to the fluidization. The mass transfer rate should therefore be much higher under fluidizing conditions than in fixed bed transfer. Furthermore, the fixed bed portion (which may be of relatively small size) can serve as a finishing or polishing section. Consequently, both a high rate of treatment and thorough removal should be obtainable. Prior to the present invention, however, it was assumed that the total adsorption capacity of the semifluidized bed would necessarily be substantially lower and for the same volume of adsorbent as in a fixed bed. This has tended to limit consideration of semifluidized beds for mass transfer. Adsorption capacity is a very important factor when large volumes of fluid are being processed as is usually the case in commercial mass transfer operations.

SUMMARY OF INVENTION

The mass transfer method of this invention utilizes semifluidized beds in a novel "stratified" form. To obtain effective stratification in a semifluidized bed system, it is necessary to employ mixtures of granules of varying size. Prior to the beginning of the mass transfer operation, a stratified semifluidized bed can be created wherein the relatively smaller sized granules are concentrated in the upper packed bed portion with relatively larger sized granules concentrated in the lower fluidized bed portion. The smaller sized granules are preferably formed of the same media material as the large size granules. At least part of the smaller size granules are packed against the sieve plate at the top of the bed to form a packed bed portion with fluidized bed portion therebeneath containing the larger size granules.

By concentrating the larger size granules in the fluidized portion of the bed, a higher mass transfer rate and larger storage capacity can be provided. These advantages can be enhanced where the fluidized portion of the bed contains the greater quantity of the media (viz. 60 to 90%) and the packed portion a smaller quantity (viz. 10 to 40%).

By having the relatively smaller particles in the packed bed portion, larger specific surfaces are provided and greater flow calming capacity is obtained. Breakthrough will be delayed due to the rapid transfer of material from the fluid phase to the interior of the granules in the fluidized bed portion, while the fixed bed portion will assure the production of a highly polished effluent. This combination permits processing of increased volumes of the fluid before breakthrough. These advantages can be obtained while realizing a reduction in the energy required to remove the fluid through the bed.

THE DRAWINGS

The method of this invention is illustrated in the accompanying drawings, wherein:

FIG. 2 is a diagrammatic cross-sectional elevational view of the mass transfer apparatus of FIG. 1 as it would appear during a mass transfer operation after the formation of the stratified bed.

DETAILED DESCRIPTION

Figure 1:
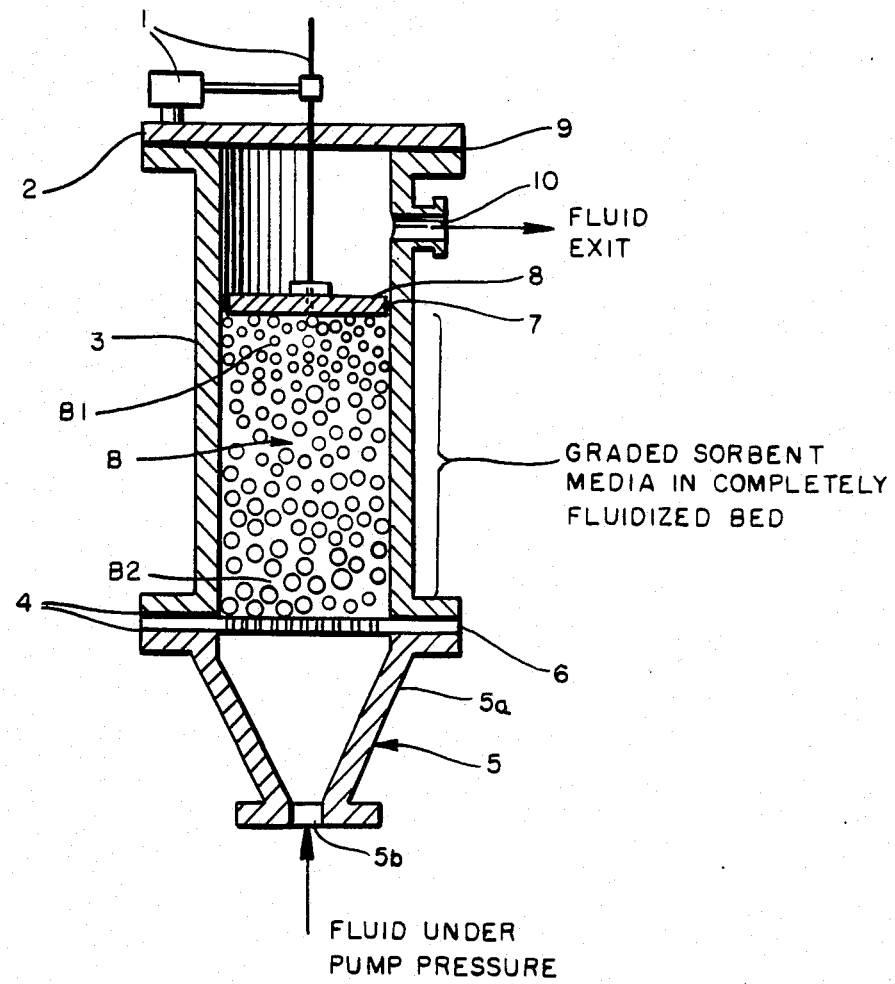
FIG. 1 is a diagrammatic cross-sectional elevational view of a mass transfer apparatus employing a mixed size medium, in accordance with the present invention, the bed being shown as it would appear immediately prior to the formation of the stratified bed.

The present invention comprises a stratified semifluidized bed method of transferring a removable component from a fluid into porous granules internally active for removal thereof. A bed of the granules is confined within an upwardly-extending treatment zone, which is provided with inlet means in the lower portion for introducing a fluid below the bed at selected fluidizing velocities. Perforated plate means (viz. a sieve plate) extends across the upper portion of the zone for fluid exit therethrough. In one embodiment, the sieve plate is vertically adjustable from an upward position in which the bed can be fully fluidized to a downward position at which an upper portion of the bed is packed against the plate with the lower bed portion fluidized. Semifluidized bed apparatus with adjustable sieve plates are described in U.S. Pat. Nos. 3,374,052, 4,253,947, 4,322,926 and 4,157,959. In another embodiment which may be used in practicing the method of this invention, the sieve plate is permanently fixed to the top of the column. In this arrangement, the fraction of bed that is fluidized can be controlled by varying the upflow fluid velocity. Increasing the velocity increases the depth of the packed bed section. With this embodiment, the smaller size granules may be fed into the bed through a side inlet for packing against the sieve plate prior to the introduction of the larger size granules.

In accordance with the method of this invention, bed granules are employed which are porous and internally active for removing and retaining a component of a gas or liquid. The bed granules comprise a mixture of granule sizes which provide substantial fractions of both relatively small and relatively large granules. For example, in certain preferred embodiments, the granule mixture contains granule sizes which are separable into a 75 weight percent fraction containing the relatively larger granules having a mean granule diameter of at least 1.2 times the mean granule diameter of the remaining 25 weight percent fraction containing the relatively smaller granules.

The porous granules may be formed of porous adsorbent media such as activated carbon, activated alumina, molecular sieves, etc. In other embodiments, the granules may be formed of cationic or anionic exchange resins. Depending on the desired application, a wide variety of porous granular media can be employed. The adsorbents may be any which have heretofore been used for selectively removing components from liquids or gases. The list below provides further illustrations of adsorbents and applications adaptable to the present invention.

| Types of Adsorbents and Applications | | | |
| --- | --- | --- | --- |
| Adsorbent | Manufacturer | Trade Name | Applications |
| Activated carbons | Calgon Corp. Pittsburgh, PA | Filtrasorb 400 Filtrasorb 300 | Liquid phase; water and wastewater treatment, purification of liquids for the removal of organic compounds such as Cd, Cu, Pb, metals, etc., and radionucleides. Vapor phase: air pollution and odor control, gas purification. Organic vapor recovery, separation of hydrocarbon mixtures, oxygen, nitrogen, etc. |
| | CECA, Inco. Tulsa, OK | GAC 30 GAC 40 | |
| | Calgon Corp. Pittsburgh, PA | Ventsorb | |
| Carbonaceons Resins (from pyrolysis of synthetic or natural resins) | Rohm and Haas Philadelphia, PA | Amersorb XE-347 Amersorb XE-348 | Liquid phase and vapor phase applications as noted above. |
| | Analabs North Haven, CT | Spherocarb | |
| | Takeda Chemical Industries Osaka, Japan | MSC-5A | |
| Polymeric Adsorbents | Rohm & Haas Co. Philadelphia, PA | Amberlite XAD-2 Amberlite XAD-4 Amberlite SAD-8 | Liquid and vapor phase applications as above. |
| | Diamond Shamrock Cleveland, OH | Duolite ES-863 | |
| Natural and Synthetic Molecular Sieves such as zeolites, mordenites, silicalite, etc. | Union Carbide Tonawanda, NY | Linde 5A | Separation of liquid mixtures, gas mixtures and vapors. Examples include pressure swing adsorption and vacuum swing adsorption for the separation of hydrogen, oxygen, and nitrogen, separation of hydrocarbon mix- |
| | W. R. Grace | Carbon Molecular Sieves | |

| | -continued | | |
|---|---|---|---|
| | Types of Adsorbents and Applications | | |
| Adsorbent | Manufacturer | Trade Name | Applications |
| | | | tures, etc. |

For carrying out a mass transfer operation, the granular mixture of varying sizes is caused to assume a stratified configuration. In one method of operation, a fluid is initially passed upwardly through the bed at a selected velocity corresponding to a minimum fluidizing velocity for the mixture. The selected velocity is calculated as the minimum for fluidizing the larger particles. The procedure for calculating such a minimum fluidizing velocity with reference to the larger granules is described in standard treatises on fluidized bed operations. See, for example, D. Kunii and O. Levenspiel, "Fluidization Engineering," John Wiley and Sons, 1969. The stratifying fluid can be a liquid or gas identical or similar to the fluid to be treated. For example, previously treated fluid can be used, or fluid can be recycled through the bed after the stratified condition has been obtained.

In forming the stratified bed, the perforated plate is adjusted to a position at which the bed can be fully fluidized at the minimum fluidizing velocity described above. The fluid flow is continued at the minimum fluidizing velocity with the bed fully fluidized until the granules in the bed become stratified with the smaller granules concentrated in the upper portion of the bed and the larger size granules concentrated in the lower portion of the bed. The time required to achieve such stratification will vary with the particular apparatus and the granular media being fluidized. However, significant stratification will usually occur within 5 to 50 minutes of fluid flow. At a minimum fluidizing velocity for the larger granules, all of the granules tend to be maintained at different levels in relation to their size. Remixing of the large and small granules occurs at a slower rate than their concentration by level in the bed.

After an effective degree of stratification has been obtained, the sieve plate is gradually lowered to cause the smaller granules concentrated in the uppermost portion of the bed to pack against the sieve plate and thereby become immobilized. The plate is lowered sufficiently to provide a packed bed portion containing primarily only the smaller size granules. The granules in the packed bed portion may comprise from 5 to 50% by weight of the total granules of the bed. Correspondingly, the fluidized portion will contain from 50 to 95% of the granules. In preferred embodiments, the packed bed section will contain from 5 to 40% by weight of the total granules, leaving 60 to 95% fluidized.

After the stratified semifluidized bed has been established, as described above, the fluid to be treated is passed upwardly successively through the fluidized and packed bed portions. The removable component is transferred into the granules of the fluidized and packed portions of the bed. A high rate of transfer is achieved in the fluidized portion, with the adsorbed component rapidly passing into the porous granules for internal adsorption or ion exchange. The relatively large size granules in the fluidized portion provide a large storage capacity for the removed component. The fluid reaching the fixed bed portion has a greatly reduced concentration of the component to be removed. In the fixed bed portion the concentration is further reduced because of the large surface area of the granules contacting the fluid, and the change from turbulent to essentially laminar flow because of the calming action of the fixed granules.

The method described above can be used for liquid-solid as well as gas-solid adsorption operations. When the fluid is a liquid, the component to be removed is a liquid or solid dissolved therein. A gaseous component may be removed by adsorption where the fluid is a gas. The method is therefore adaptable to both liquid and gas phase transfers to the solid media.

The adsorption or ion exchange operation is continued until the bed granules become so loaded with the removed component that "breakthrough" occurs. At this point, the fixed bed portion is not reducing the component in the effluent to an acceptable level. Desorption or stripping may be carried out without disturbing the stratified condition of the bed. The desorption or stripping fluid is passed through the bed without shut-down so that the transfer from the fluid being treated to the desorption or stripping fluid is continuous, and the same fluidizing velocity can be maintained. Alternatively, the bed may be permitted to settle, and then partially or completely refluidized in the desorption or stripping stage. With complete fluidization any solid particles which have accumulated in the fixed bed portion can be swept out of the treating zone.

Minor fluctuations in fluidizing velocities are not a problem once the stratification has been established. If the fluctation is in the direction of increased velocity, additional granules of larger size may be temporarily added at the lower boundary of the fixed bed portion. The added granules will drop off as the velocity returns to the pre-established level. Where the fluctuation is in the direction of decreased velocity, some of the small granules may be removed from the bottom of the fixed bed portion. These will tend to remain segregated adjacent to the lower boundary of the fixed bed portion, and will be redeposited when the velocity returns to the higher pre-established velocity. Protection against such changes in the depth of the fixed bed portion is also provided by initially establishing a fixed bed of more than adequate depth to control breakthrough.

The method of this invention is further illustrated by the following experimental and illustrative examples.

EXPERIMENTAL EXAMPLES

The adsorbent used was Filtrasorb 400 (F-400), a bituminous coal-based activated carbon supplied by the Calgon Corporation, Pittsburgh, PA. The F-400 carbon as supplied had mixed size particles in the 12 to 40 sieve size range, surface area of 1000 to 1200 $m^2/gm$, a pore volume of 0.94 ml/gm and particle density of 1.3 to 1.4 gm/ml. A complete sieve analysis is shown below in Table A. The 18/20 size fraction (passing No. 18 sieve and retained on No. 20 sieve) was used for comparison with the mixed size F-400 material.

These adsorbents were washed with deionized distilled water and dried to a constant weight at 110° C. prior to use. A constant quantity of 648 gms of the carbon was used in all runs. Reagent grade phenol was used as the solute. Influent concentration of $10^{-3}$ moles/liter was used for all the studies.

A 5.08 cm plexiglass column was used in all the studies. Tap water filtered through a pre-adsorption column was supplied to the column by a positive displacement pump. A metering pump discharged a concentrated solution of phenol into the line. The flow rate was maintained constant at 1.408 $m^3/m^2$/min. for all the experiments. Influent and effluent concentrations were measured at periodic intervals using ultraviolet/visible spectrophotometry.

Four experimental conditions were examined: (a) packed bed operation; (b) semifluidized bed operation with 25% of the bed fluidized; (c) semifluidized bed with 50% of bed fluidized and (d) semifluidized bed with 75% of the bed fluidized. The results are summarized below in Table B.

TABLE A

| | Filtrasorb 400 Activated Carbon Granule Size Classification | | |
|---|---|---|---|
| Passing (U.S. Sieve No.) | Retained on (U.S. Sieve No.) | Geometric Mean Diameter (microns) | Weight Fraction |
| — | 14 | 1539 | 0.177 |
| 14 | 16 | 1295 | 0.165 |
| 16 | 18 | 1090 | 0.141 |
| 18 | 20 | 917 | 0.243 |
| 20 | 25 | 772 | 0.144 |
| 25 | 35 | 596 | 0.121 |
| 35 | 50 | 385 | 0.009 |

TABLE B

| | Comparison of Uniform Granule Size With Mixed Size Adsorbent | | |
|---|---|---|---|
| Activated Carbon Adsorbent | Percent of Bed Fluidized | Volume Processed at C/Co = 0.05 F ($m^3$) | $(F)_{SFBA}$ $(F)_{PBA}$ |
| Uniform (18-20 mesh) | 0%* | 0.50 | 1.00 |
| | 23% | 0.48 | 0.96 |
| | 50% | 0.46 | 0.92 |
| | 76% | 0.42 | 0.84 |
| Mixed (12-40 mesh) | 0%* | 0.76 | 1.00 |
| | 25% | 0.76 | 1.00 |
| | 50% | 0.90 | 1.18 |
| | 75% | 0.92 | 1.22 |

*100% packed bed

Desorption was carried out with tap water without any solute. The bed was maintained in the same condition as for the adsorption. The initial concentration at which the columns were switched from adsorption to desorption was $9.04 \times 10^{-4}$ M for the semifluidized beds, and $8.85 \times 10^{-4}$ M for the completely packed bed. Desorption behavior was almost identical to that of adsorption. The rates for the semifluidized and packed beds were comparable.

ILLUSTRATIVE EXAMPLES

Figure 1A:
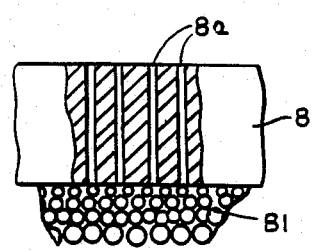
FIG. 1A is an enlarged fragmentary sectional view of the restraining sieve plate of FIG. 1.

The method of this invention in relation to particular embodiments thereof is further illustrated in FIGS. 1, 1A and 2 of the drawings. As there shown, the semifluidized bed contactor apparatus includes a column 3 providing an upwardly-extending treatment zone. This zone has inlet means 5 in the lower portion thereof for introducing a fluid. This inlet means includes a conical section 5a, to which fluid is introduced through a port 5b for distribution and entry through a perforated distributor plate 6, which is clamped between gaskets 4. The bed of porous granules extends upwardly from plate 6 to the sieve plate 8. A motor drive, operating mechanism 1, is provided for making vertical adjustments of the sieve plate 8, which is slidably sealed to the inner walls of column 3 by an O-ring 7. Above the level of the sieve plate 7 there is provided a fluid outlet 10 extending through the side wall of column 3. As shown in FIG. 1A, plate 8 is provided with passages 8a, which are sized to retain granules of the bed, including the smallest size granules. The perforations in the lower plate 6 are similarly sized.

As shown in FIG. 1, the bed is in a fully fluidized condition. The fluid is introduced under pump pressure below the bed at a minimal velocity for full fluidization. The granules will assume a stratified condition by size with the smaller granules B1 concentrating in the upper portion of the bed, and the larger granules B2 concentrating in the lower portion of the bed. The sieve plate 8 is shown as being contiguous to the uppermost portion of the fluidized bed. However, in the fully fluidized condition of the bed, sieve plate 8 could be withdrawn to a higher level, leaving a free space between the top of the bed and the plate.

Looking now at FIG. 2, a condition is shown in which the sieve plate 8 has been lowered from the position shown in FIG. 1. Lowering of the sieve plate with the continuance of the fluid flow at the same velocity results in packing of the uppermost granules, composed predominately of the small granules B-1, against the sieve plate. In this way, a packed bed portion is provided in the uppermost portion of the bed, while the lowermost portion of the bed, containing predominately the larger granules B-2 remains in fluidized condition. With this arrangement of the bed, the fluid containing the material to be removed is passed through the bed using a velocity which maintains the semifluidized, stratified condition of the bed. The component being removed first contacts the larger granules which are in fluidized violent agitation, and is rapidly adsorbed by these granules. The fluid of greatly reduced concentration of the component exits through the packed bed portion, which acts to calm the flow to more nearly a laminar flow, and removes additional component. This results in a highly finished fluid, which passes through the sieve plate 8 and exits through the outlet 10.

In the embodiment of FIGS. 1 and 2, the granules are composed of a single medium so that the material of the granules has the same density. The difference between the granules is therefore only one of particle size. Preferably, the size differences are appreciable with stratified relatively large and relatively small granule sizes being included.

Minimum Fluidization Velocity

The minimum velocity for incipient fluidization will vary as a function of the particle diameter and shape and the fluid and solid properties at the operating temperature. It can be determined using simple experimental procedures or calculated using empirical correlations. Calculations are given below for minimum fluidization velocities for Filtrasorb-400 activated carbon using water or air as the fluidizing fluid.

Liquid-Solid Fluidized Bed

Operating temperature = 20° C.
Largest F-400 particle diameter = 0.1539 cm
Viscosity of water = 1 cp
Density of water = 1.0 $gm/cm^3$
Density of activated carbon = 1.35 $gm/cm^3$ The minimum fluidization velocity, $U_{mf}$ is given by (Leva, M., "Fluidization," McGraw-Hill, New York, 1959):

$$U_{mf}=[0.00381\ (d_p)^{1.82}(\gamma\{\gamma_m-\gamma\})^{0.94}]/\mu^{0.88}$$

where, $d_p$ is the particle diameter in mm, $\gamma$ and $\gamma_m$ are specific weights of water and activated carbon in lb/ft$^3$, $\mu$ is the viscosity of water in centipoises and $U_{mf}$ is in gallons/min ft$^2$ Therefore, $$U_{mf}=0.5\ cm/sec$$

Gas-Solid Fluidized Beds

Operating temperature = 20° C.
Largest F-400 particle diameter = 0.1539 cm
Density of activated carbon = 1.35 gm/cm$^3$
Density of air = 1.388 × 10$^{-3}$ gm/cm$^3$
Viscosity of air = 0.0178 cp
The minimum fluidization velocity is given by the expression (D. Kunii and O. Levenspiel, John Wiley & Sons, New York, 1969):

$$d_p U_{mf} \rho_g = [33.7^2 + 0.0408 d^3 \rho_g \mu^{-2}(\rho_s-\rho_g)]^{\frac{1}{2}} - 33.7$$

where, $\rho_g$ and $\rho_s$ are densities of gas and solid respectively, $\mu$ is the viscosity of the gas, $d_p$ is the particle diameter, and $U_{mf}$ is the minimum fluidizing velocity.
Therefore, $$U_{mf}=54\ cm/sec.$$

ION EXCHANGE EMBODIMENTS

Inorganic and organic ion exchange resins are available for the removal of anions and cations from solutions (see Perry, H. J., Chemical Engineers' Handbook, McGraw-Hill, New York; Kunin, R., Ion Exchange Resins, John Wiley & Sons, New York, 1958). Commercial applications include municipal water treatment, industrial water treatment, chemical and metallurgical processing, catalysis, etc. Ion exchange is also widely used in the field of analytical chemistry. Typical anion and cation exchange resins are listed in the attached Table. In addition to these, other types of resins such as chelating ion exchange resins, catalysts and resins for specific use such as alkyl benzene sulfonate removal have been synthesized.

| Table of Ion Exchange Resins | | |
|---|---|---|
| Type of Resin | Functional Group | Trade Name |
| Strong Acid | —SO$_3$H | Duolite C-20, Amberlite 120, Dowex 50 |
| Weak Acid | —COOH | Duolite C-433 Amberlite IRC-50 |
| Strong Base Type I | —CH$_2$N(CH$_3$)$_3$$^+$OH$^-$ | Amberlite IRA-410 Duolite A-101D |
| Strong Base Type II | —CH$_2$N(CH$_3$)$_2$CH$_2$CH$_2$OH$^+$OH$^-$ | Amberlite IRA 140 Duolite A-102D |
| Weak Base | —N(CH$_3$)$_2$H$^+$OH$^-$ | Duolite A-7 Amberlite A-30B |

| Table of U.S. Ion Exchange Resin Manufacturers | |
|---|---|
| Manufacturer | Trade Name |
| Dow Chemical Company Functional Products and Systems Midland, MI 48640 | Dowex Resins |
| Diamond Shamrock Chemical Co. Noplo Chemical Division 1901 Spring St. Redwood City, CA 94063 | Duolite Resins |
| Ionac Division of Sybron Corp. Birmingham, NJ 08011 | Ionac Resins |
| Rohm and Haas Company Fluid Process Chemicals Dept. Philadelphia, PA 19105 | Amberlite Resins |

We claim:
1. The stratified semifluidized bed method of transferring a component from a fluid into porous granules internally active for removal thereof, wherein a bed of said granules is confined within an upwardly-extending treatment zone, said zone having inlet means in the lower portion thereof for introducing a fluid below said bed at selected fluidizing velocities and perforated plate means extending across the upper portion of said zone for fluid exit therethrough, comprising the steps of:
(a) employing as said semifluidized bed a mixture of said porous granules which contains effective amounts of both relatively small and relatively large granules;
(b) preparing said bed for removal of said component by stratifying said bed with the smaller size granules concentrated in the bed upper portion and the larger size granules concentrated in the bed lower portion;
(c) packing at least part of said stratified smaller granules against said plate means to form a packed bed portion with a fluidized bed portion therebeneath containing said relatively larger granules, said packed bed portion containing from 5 to 50% by weight of the total bed granules; and
(d) thereafter passing upwardly through said bed said component-containing fluid at a velocity sufficient to maintain said bed in a stratified semifluidized condition as said component is removed therefrom into the fluidized larger granules and successively into the packed smaller granules.
2. The method of claim 1 wherein the fluid is a gas.
3. The method of claim 1 wherein the fluid is a liquid.
4. The method of claim 1 in which said mixture contains granule sizes which are separable into a 75 weight percent fraction containing the relatively larger granules having a mean granule diameter at least 1.2 times the mean granule diameter of the remaining 25 weight percent fraction containing the relatively smaller granules.
5. The method of claim 1 in which all of the granules of said mixture are formed from the same medium.
6. The stratified semifluidized bed method of adsorbing a component from a fluid into porous granules internally active for adsorption thereof, wherein a bed of said granules is confined within an upwardly-extending treatment zone, said zone having inlet means in the lower portion thereof for introducing a fluid below said bed at selected fluidizing velocities and perforated plate means extending across the upper portion of said zone for fluid exit therethrough, comprising the steps of:
(a) employing as said semifluidized bed a mixture of granule sizes providing both relatively small and relatively large granules, said mixture containing granule sizes which are separable into a 75 weight percent fraction containing the larger granules having a mean granule diameter at least 1.2 times the mean granule diameter of the remaining 25 weight percent fraction containing the smaller granules;

(b) preparing said bed for adsorption of said component by stratifying said bed with the smaller size granules concentrated in the upper bed portion and the larger size granules concentrated in the lower bed portion;

(c) packing at least part of said stratified smaller granules against said plate means to form a packed bed portion with a fluidized bed portion therebeneath containing said larger size granules, said packed bed portion containing from 5 to 40% by weight of the total bed granules; and (d) thereafter passing upwardly through said bed said component-containing fluid at a velocity sufficient to maintain said bed in a stratified semifluidized condition as said component is adsorbed into the fluidized larger granules and successively into the packed smaller granules.

7. The method of claim 6 wherein the fluid is a gas.

8. The method of claim 6 wherein the fluid is a liquid.

9. The method of claim 6 in which all of the granules of said mixture are formed from the same medium.

10. The method of claim 6 in which said granules are formed of an ion exchange resin.

* * * * *